United States Patent
Perinchery

(10) Patent No.: US 11,982,352 B2
(45) Date of Patent: May 14, 2024

(54) APPARATUS FOR ELIMINATING SLACK AND VIBRATIONS IN THE CHAIN OF A CHAIN DRIVE

(71) Applicant: Ashlyn Antony, Tamil Nadu (IN)

(72) Inventor: Narayanankutty Pramod Perinchery, Kerala (IN)

(73) Assignee: Ashlyn Antony, Tamil Nadu (IN)

( * ) Notice: Subject to any disclaimer, the term of this patent is extended or adjusted under 35 U.S.C. 154(b) by 0 days.

(21) Appl. No.: 18/009,181

(22) PCT Filed: Oct. 22, 2020

(86) PCT No.: PCT/IB2020/059929
§ 371 (c)(1),
(2) Date: Dec. 8, 2022

(87) PCT Pub. No.: WO2021/250459
PCT Pub. Date: Dec. 16, 2021

(65) Prior Publication Data
US 2023/0258246 A1    Aug. 17, 2023

(30) Foreign Application Priority Data
Jun. 9, 2020   (IN) .............................. 202041024165

(51) Int. Cl.
*F16H 7/08*   (2006.01)
*F16H 7/06*   (2006.01)

(52) U.S. Cl.
CPC .............. *F16H 7/0834* (2013.01); *F16H 7/06* (2013.01); *F16H 7/08* (2013.01);
(Continued)

(58) Field of Classification Search
CPC ...... F16H 7/06; F16H 7/08; F16H 2007/0802; F16H 2007/0812; F16H 7/0829;
(Continued)

(56) References Cited

U.S. PATENT DOCUMENTS 3,008,772 A * 11/1961 Helsel, Sr. ............. B62D 55/30
 92/18
3,647,270 A *  3/1972 Althaus .................. B62D 55/30
 305/146
(Continued)

FOREIGN PATENT DOCUMENTS

CN      209959815 U    1/2020
CN      108223725 B    2/2020
(Continued)

OTHER PUBLICATIONS

Search Report for International Application No. PCT/IB2020/059929 dated Dec. 10, 2020.

*Primary Examiner* — Michael R Mansen
*Assistant Examiner* — Raveen J Dias
(74) *Attorney, Agent, or Firm* — Dennemeyer & Associates LLC

(57) ABSTRACT

The present disclosure discloses an apparatus (100) for eliminating slack and vibrations of the chain (400) comprising a piston-cylinder arrangement. A first piston (10) is configured to be displaced inside the cylinder (20) of the piston-cylinder arrangement and a second piston (30) is configured to be displaced inside a cavity (40) defined inside the first piston (10) with the axis of the cavity (40) being coaxial with the axis (A) of the cylinder. A lubricating oil passage (50) defined to pass through the first piston (10), the second piston (30) and the cylinder (20) of the piston cylinder arrangement. The apparatus facilitates reduction in vibrations, slack elimination and automatic lubrication of the chain drive.

7 Claims, 4 Drawing Sheets

(52) U.S. Cl.
CPC ............... *F16H 2007/0812* (2013.01); *F16H 2007/0859* (2013.01); *F16H 2007/087* (2013.01); *F16H 2007/0891* (2013.01); *F16H 2007/0895* (2013.01); *F16H 2007/0897* (2013.01)

(58) Field of Classification Search
CPC .... F16H 7/0834; F16H 7/0836; F16H 7/0848; F16H 2007/0859; F16H 2007/0863; F16H 2007/087; F16H 2007/0891; F16H 2007/0895; F16H 2007/0897; F16H 2007/0806; F16H 2007/0814; F02B 67/06; F01L 1/022

See application file for complete search history.

(56) References Cited

U.S. PATENT DOCUMENTS

| | | | |
|---|---|---|---|
| 4,040,305 A * | 8/1977 | Cadic | F16H 7/08 474/135 |
| 4,284,192 A * | 8/1981 | Taylor | B65G 23/44 198/813 |
| 4,527,462 A * | 7/1985 | Okabe | F16H 7/08 92/51 |
| 4,533,341 A * | 8/1985 | Yokota | F16H 7/1236 474/136 |
| 4,539,001 A * | 9/1985 | Okabe | F16H 7/0848 474/138 |
| 4,674,996 A * | 6/1987 | Anno | F16H 7/129 474/133 |
| 4,681,376 A * | 7/1987 | Riml | B62D 55/30 305/149 |
| 4,695,268 A * | 9/1987 | Kodama | F16H 7/0848 474/110 |
| 4,940,447 A * | 7/1990 | Kawashima | F16H 7/0848 474/138 |
| 5,065,709 A * | 11/1991 | Ito | F01L 1/267 123/90.31 |
| 5,246,247 A * | 9/1993 | Runkel | B60G 17/0152 280/124.159 |
| 5,482,262 A * | 1/1996 | Hayakawa | F16H 7/1236 474/138 |
| 5,586,952 A * | 12/1996 | Izutsu | F16H 7/1236 474/138 |
| 5,637,047 A * | 6/1997 | Schulze | F16H 7/0848 474/136 |
| 5,653,651 A * | 8/1997 | Kawashima | F16H 7/0848 474/110 |
| 5,851,058 A * | 12/1998 | Humbek | B62D 55/30 305/152 |
| 5,913,742 A * | 6/1999 | Nakamura | F16H 7/0848 474/110 |
| 5,961,410 A * | 10/1999 | Yamamoto | F16H 7/1236 474/138 |
| 5,967,920 A * | 10/1999 | Dembosky | F16H 7/0848 474/140 |
| 5,967,923 A * | 10/1999 | Petri | F16F 9/49 474/138 |
| 6,045,471 A * | 4/2000 | Suzuki | F16H 7/08 474/110 |
| 6,106,424 A * | 8/2000 | Kratz | F16H 7/0836 474/138 |
| 6,155,942 A * | 12/2000 | Ullein | F16H 7/1236 474/138 |
| 6,193,623 B1 * | 2/2001 | Koch | F16H 7/0836 474/138 |
| 6,244,982 B1 * | 6/2001 | Merelli | F16H 7/08 474/138 |
| 6,471,611 B1 * | 10/2002 | Hotta | F16H 7/1236 474/109 |
| 6,602,154 B1 * | 8/2003 | Guichard | F16H 7/0848 474/101 |
| 6,609,987 B1 * | 8/2003 | Beardmore | F01L 1/02 474/140 |
| 6,945,889 B2 * | 9/2005 | Markley | F16H 7/0848 474/111 |
| 7,033,295 B2 * | 4/2006 | Garbagnati | F16H 7/0836 474/111 |
| 8,062,157 B2 * | 11/2011 | Geibel | F16H 7/0836 474/111 |
| 9,133,916 B2 * | 9/2015 | Hofmann | F16H 7/0836 |
| 9,464,697 B2 * | 10/2016 | Antchak | F16H 7/12 |
| 9,581,216 B2 * | 2/2017 | Parizek | F16F 9/063 |
| 10,107,369 B2 * | 10/2018 | Kurematsu | F16H 7/0838 |
| 10,982,737 B2 * | 4/2021 | Kurematsu | F16H 7/0848 |
| 2001/0003279 A1 * | 6/2001 | Brandl | F01L 1/022 123/90.31 |
| 2001/0007840 A1 * | 7/2001 | Nakakubo | F16H 7/0836 474/138 |
| 2001/0007841 A1 * | 7/2001 | Nakakubo | F16H 7/0836 474/138 |
| 2002/0098932 A1 * | 7/2002 | Hashimoto | F16H 7/0848 474/110 |
| 2002/0142871 A1 * | 10/2002 | Namie | F16H 7/0836 474/110 |
| 2003/0171179 A1 * | 9/2003 | Okuda | F16H 7/129 474/135 |
| 2003/0228948 A1 * | 12/2003 | Garbagnati | F16H 7/0836 474/111 |
| 2004/0087399 A1 * | 5/2004 | Hayakawa | F01L 1/02 474/110 |
| 2004/0092348 A1 * | 5/2004 | Hashimoto | F16H 7/0848 474/110 |
| 2004/0092350 A1 * | 5/2004 | Hashimoto | F16H 7/0848 474/110 |
| 2005/0064969 A1 * | 3/2005 | Tomita | F16H 7/0836 474/101 |
| 2007/0032323 A1 * | 2/2007 | Yoshida | F16H 7/0848 474/110 |
| 2007/0270259 A1 * | 11/2007 | Koch | F16H 7/0848 474/110 |
| 2007/0287562 A1 * | 12/2007 | Assel | F16H 7/0848 474/110 |
| 2008/0015069 A1 * | 1/2008 | Kroon | F16H 7/0836 474/110 |
| 2008/0064546 A1 * | 3/2008 | Ullein | F16H 7/0848 474/110 |
| 2008/0248906 A1 * | 10/2008 | Ullein | F16H 7/0848 474/110 |
| 2008/0287232 A1 * | 11/2008 | Botez | F16H 7/0848 474/110 |
| 2009/0111627 A1 * | 4/2009 | Geibel | F16H 7/0836 123/90.31 |
| 2009/0111628 A1 * | 4/2009 | Poiret | F16H 7/0848 474/110 |
| 2010/0087284 A1 * | 4/2010 | Norimatsu | F16H 7/0848 474/110 |
| 2011/0003657 A1 * | 1/2011 | Reinhart | F16H 7/0848 29/525.01 |
| 2011/0012045 A1 * | 1/2011 | Schaefer | F16H 7/0848 251/337 |
| 2012/0202629 A1 * | 8/2012 | O'Shea | F16H 7/0836 474/110 |
| 2014/0057748 A1 * | 2/2014 | Satomura | F16H 7/1236 474/110 |
| 2014/0187369 A1 * | 7/2014 | Todd | F16H 7/0848 474/110 |
| 2014/0309882 A1 * | 10/2014 | Antchak | F02B 67/06 474/104 |
| 2015/0024887 A1 * | 1/2015 | Oh | F16H 7/0848 474/110 |
| 2015/0211594 A1 * | 7/2015 | Parizek | F16H 7/08 267/121 |
| 2015/0226345 A1 * | 8/2015 | Hartmann | F16K 15/044 137/539 |
| 2015/0330482 A1 * | 11/2015 | Todd | F16H 7/0836 474/109 |

(56) References Cited

U.S. PATENT DOCUMENTS

| | | | |
|---|---|---|---|
| 2016/0033016 A1* | 2/2016 | Todd | F16H 7/0836 |
| | | | 474/111 |
| 2016/0348765 A1* | 12/2016 | Ishikawa | F16H 7/08 |
| 2017/0138443 A1* | 5/2017 | Kurematsu | F16H 7/0838 |
| 2017/0175858 A1* | 6/2017 | Ryeland | F02B 67/06 |
| 2017/0356529 A1* | 12/2017 | Simmons | F16H 7/0848 |
| 2017/0363181 A1* | 12/2017 | Freemantle | F16H 7/0848 |
| 2017/0370447 A1* | 12/2017 | Freemantle | F16H 7/0848 |
| 2018/0017142 A1* | 1/2018 | Mochizuki | F16H 7/0836 |
| 2018/0066734 A1* | 3/2018 | Morimoto | F16H 7/0836 |
| 2018/0259044 A1* | 9/2018 | Ness | F16H 7/0848 |
| 2018/0306281 A1* | 10/2018 | Morimoto | F16H 7/0836 |
| 2018/0363739 A1* | 12/2018 | Hartmann | F16H 7/08 |
| 2019/0376583 A1* | 12/2019 | Guillot | F16H 7/0834 |
| 2020/0011401 A1* | 1/2020 | Kurematsu | F16H 7/0848 |
| 2020/0018383 A1* | 1/2020 | Lu | F16H 7/0848 |
| 2020/0182270 A1* | 6/2020 | Ludwick | F16H 7/08 |

FOREIGN PATENT DOCUMENTS

| | | | | |
|---|---|---|---|---|
| DE | 102014211516 A1 * | 1/2016 | | F02B 67/06 |
| DE | 102015209558 A1 * | 1/2016 | | F16H 7/08 |
| EP | 1158287 A2 * | 11/2001 | | F16H 7/08 |
| JP | H0893866 A * | 4/1996 | | F16H 7/0848 |
| KR | 950014630 A * | 6/1995 | | F16H 2007/0859 |
| WO | WO-2004031614 A1 * | 4/2004 | | F02B 67/06 |

\* cited by examiner

Figure 1 - PRIOR ART

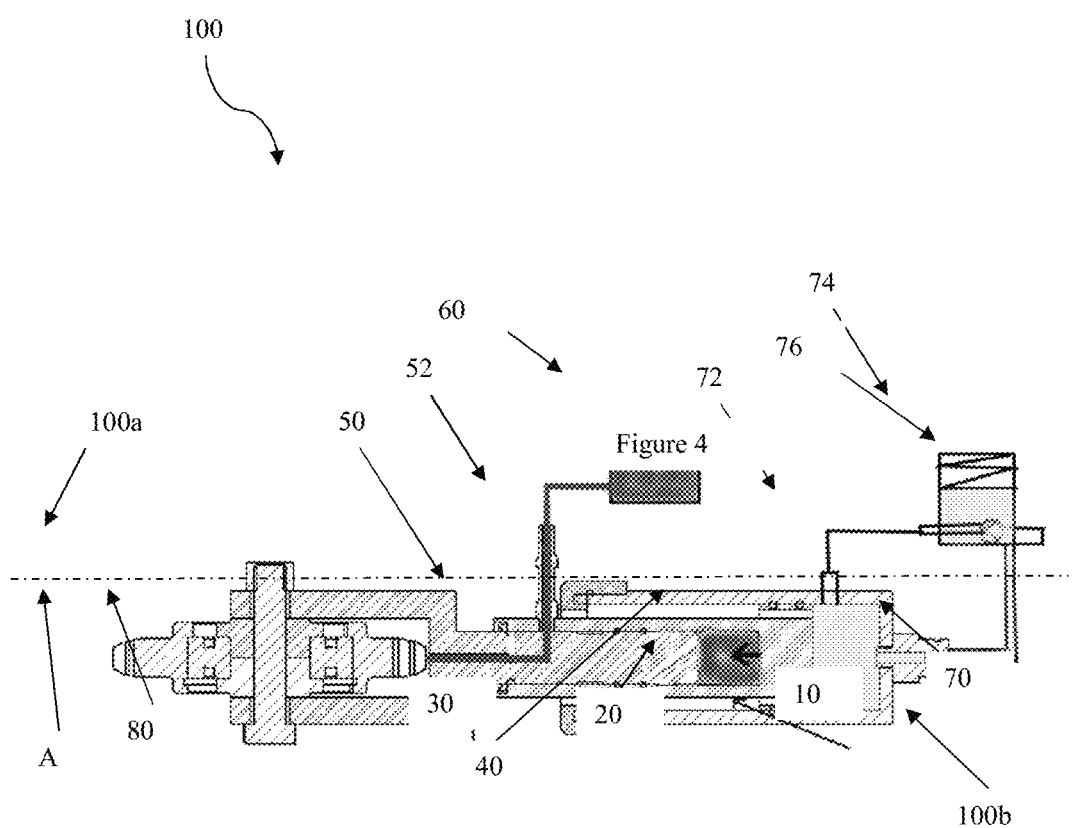

APPARATUS FOR ELIMINATING SLACK AND VIBRATIONS IN THE CHAIN OF A CHAIN DRIVE

FIELD

The present disclosure relates to the field of chain drives and particularly to a slack and vibration eliminating apparatus used with chain drives.

BACKGROUND

The background information herein below relates to the present disclosure but is not necessarily prior art.

Chain tensioner devices facilitate eliminating chain slack arising in chain drives. Chain slack is a result of prolonged usage of chain drives. The links of the chain drives elongate in length with due course of usage time of the chain drives. The slack in the chain drives gives rise to unwanted vibrations and thus results in noisy operation of the chain drives. Conventional devices for eliminating chain slack and vibrations typically have a pre-tensioned spring that facilitates eliminating slack and prevent vibrations and noisy operation. However, the stiffness of the spring needs to be adjusted every time to eliminate such slack. This requires periodic servicing procedure. Moreover, the chain drives need to be lubricated frequently which again requires periodic maintenance scheduling. Additionally, adjusting chain drive slack requires human skill, as spring characteristics for a particular application is distinct.

A need was therefore felt for an apparatus for eliminating slack and vibrations in a chain drive that would overcome the aforementioned issues.

Objects

Some of the objects of the present disclosure, which at least one embodiment herein satisfies, are as follows:

An object of the present disclosure is to provide an apparatus for eliminating slack and vibrations in a chain drive that eliminates periodic maintenance and servicing.

Another object of the present disclosure is to provide an apparatus for eliminating slack and vibrations in a chain drive that eliminates the requirement of skilled labour.

Still another object of the present disclosure is to provide an apparatus for eliminating slack and vibrations in a chain drive that delivers optimum chain drive performance.

Other objects and advantages of the present disclosure will be more apparent from the following description, which is not intended to limit the scope of the present disclosure.

SUMMARY

The present disclosure discloses an apparatus for eliminating slack and vibrations of a chain comprising a piston-cylinder arrangement. A first piston is configured to be displaced inside the cylinder of the piston-cylinder arrangement and a second piston is configured to be displaced inside a cavity defined inside the first piston with the axis of the cavity being coaxial with the axis of the cylinder. A lubricating oil passage defined to pass through the first piston, the second piston and the cylinder of the piston cylinder arrangement. The apparatus facilitates reduction in vibrations, slack elimination and automatic lubrication of the chain drive.

A first end 50a of the lubricating oil passage is configured to be in fluid communication with the chain drive and a second end 50b of the lubricating oil passage is configured to be in fluid communication with a lubricating oil reservoir.

In a preferred embodiment, a grease port is provided on one end of the cylinder, the grease port is configured to be in fluid communication with the first piston.

The apparatus is provided with a pressure sensor on the cylinder to sense the pressure of grease inside the cylinder.

The apparatus is provided with a metering valve attached on one end of the lubricating oil passage.

The first piston is configured to be displaced by pressure of grease flowing through the grease port.

The second piston is configured to be displaced by the pressure of silicon oil contained in the cavity.

A sprocket wheel is configured to be attached to the second piston on one end, and configured to in contact with the chain drive on the other end.

BRIEF DESCRIPTION OF THE ACCOMPANYING DRAWING

The apparatus for eliminating slack and vibrations in a chain drive of the present disclosure will now be described with the help of the accompanying drawing, in which:

FIG. 4 shows a sectional view of FIG. 2 at an instant when the lubricating oil passage is open for supply of lubricating oil to a chain drive.

LIST OF REFERENCE NUMERALS

1000— chain drive
A— longitudinal axis
10—first piston
20—cylinder
30— second piston
40—cavity
50— lubricating oil passage
50a— first end of lubrication oil passage
50b— second end of lubrication oil passage
52—metering valve
60—lubricating oil reservoir
70— grease port
72—pressure sensor
74—grease dispenser
76—pump
80', 80— sprocket wheel
100, 100'— apparatus
100a— first end
100b— second end
200, 200'— drive sprocket
300, 300'— driven sprocket
400, 400'— chain

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to" or "coupled to" another element, it may be directly on, engaged, connected or coupled to the other element. As used herein, the term "and/or" includes any and all combinations of one or more of the associated listed elements.

Terms such as "inner", "outer", "beneath", "below", "lower", "above", "upper" and the like, may be used in the present disclosure to describe relationships between different elements as depicted from the figures.

Figure 1:
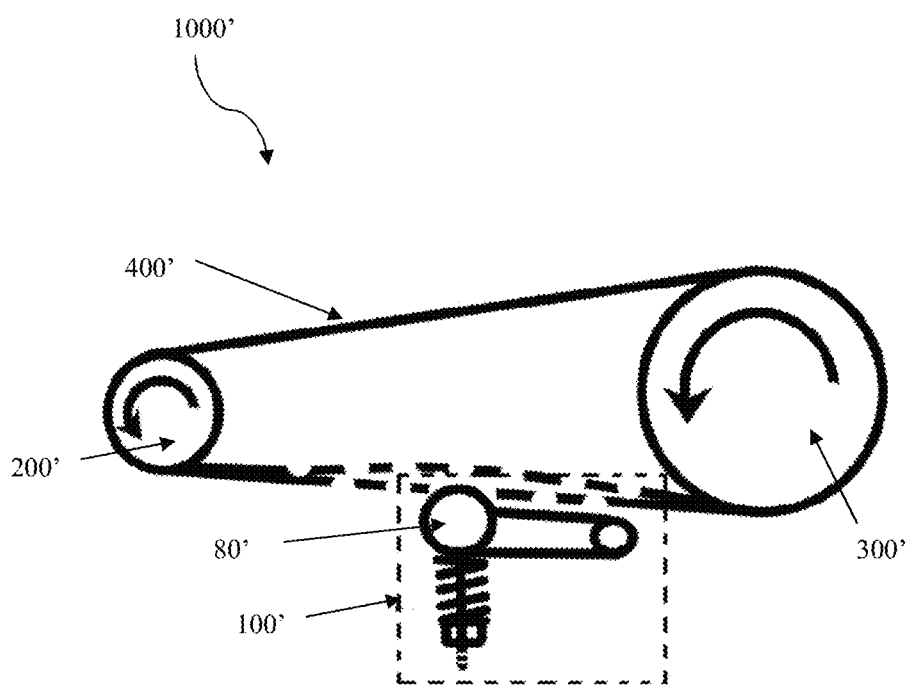
FIG. 1 shows a schematic of an apparatus for eliminating slack and vibrations in a chain drive, in accordance with prior art.

FIG. 1 shows a chain drive 1000', in accordance with prior art, with an apparatus 100' having a sprocket wheel 80' for eliminating slack and tension in the chain 400' configured to run between a drive sprocket 200' and driven sprocket 300'. The apparatus 100' comprises a spring which needs to be adjusted periodically to change stiffness of the spring, thereby eliminating the slack in the chain 400'.

Figure 2:
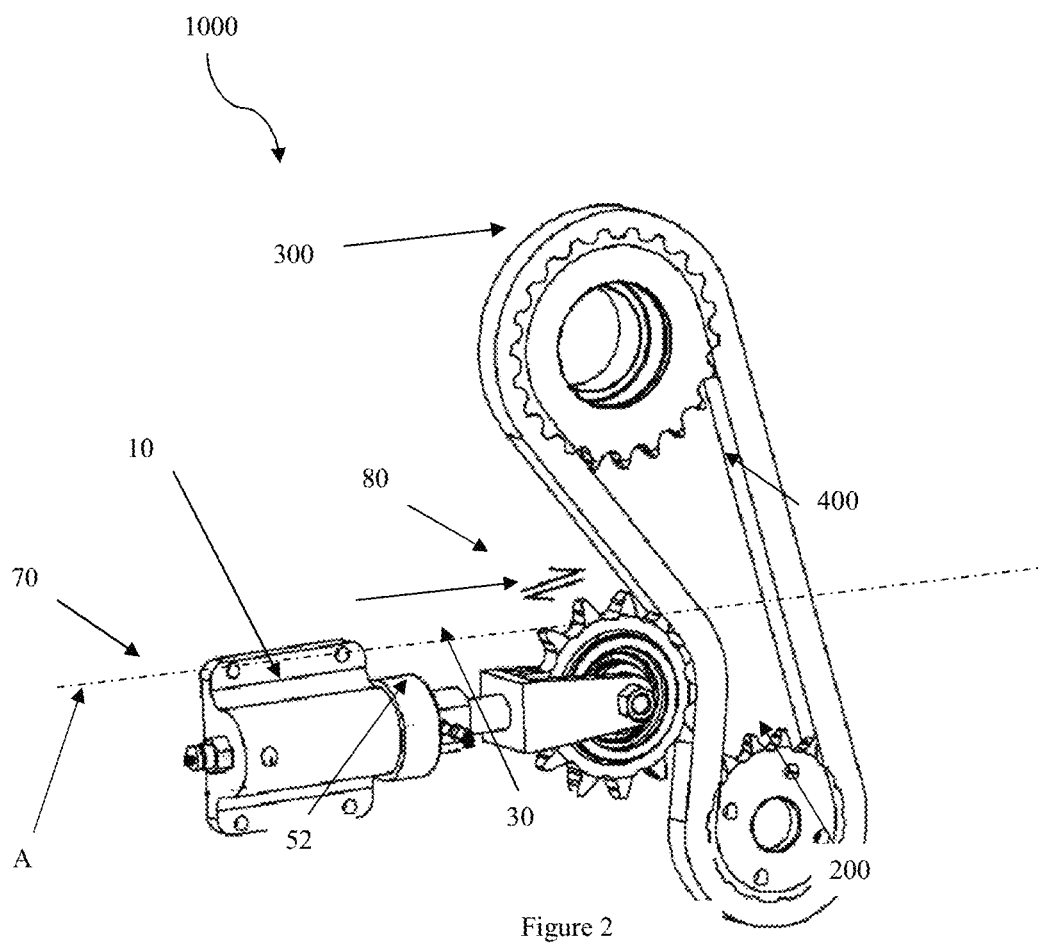
FIG. 2 shows an isometric view of an apparatus for eliminating slack and vibrations in a chain drive, in accordance with an embodiment of the present disclosure.
Figure 3:
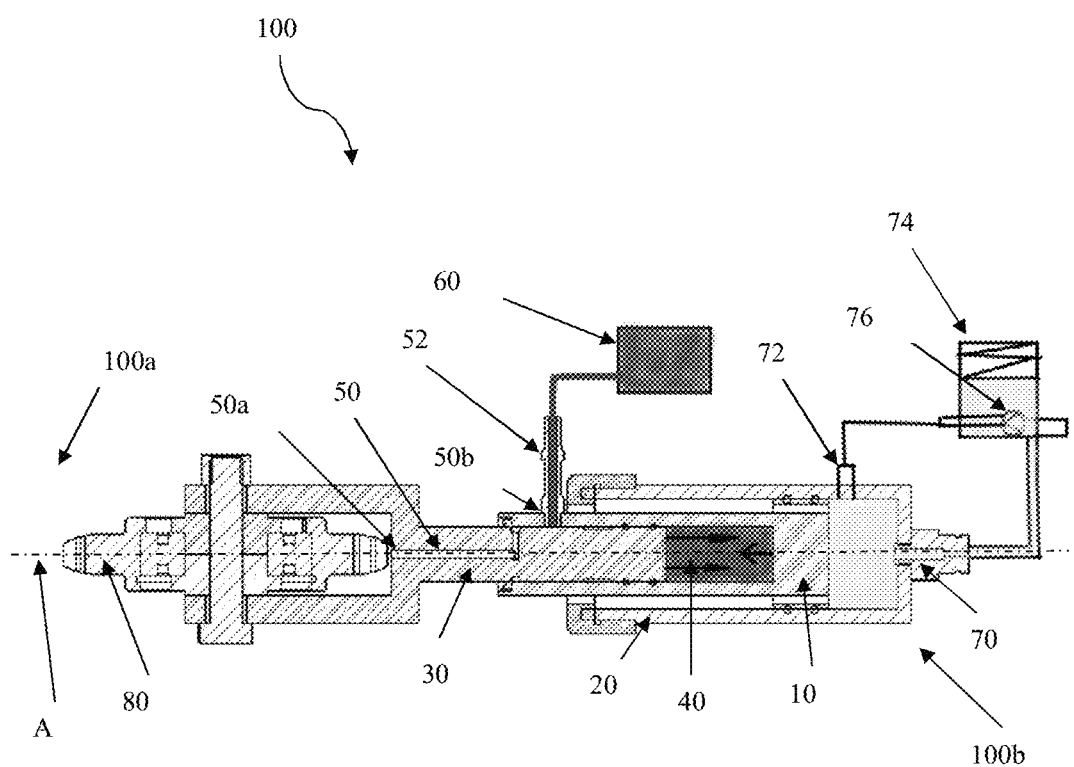
FIG. 3 shows a sectional view of FIG. 2 at an instant when the lubricating oil passage is closed for supply of lubricating oil to a chain drive.

Referring to FIG. 2-4, an apparatus (100) for eliminating slack and vibrations in a chain drive 1000 is shown in accordance with an embodiment of the present disclosure. The apparatus 100 has a first end 100a and a second end 100b. The apparatus 100 comprises a piston cylinder arrangement with a first piston 10 configured to slide inside a cylinder 20 along the cylinder longitudinal axis A. The first piston 10 is configured to be acted upon by the pressure of a first fluid. In a preferred embodiment, the first fluid is grease. The second piston 30 is configured to slide inside a cavity 40 defined inside the first piston 10. The second piston 30 is configured to be acted upon by the pressure of a second fluid. In a preferred embodiment, the second fluid is silicone oil. The cavity 40 is oriented along an axis that coincides with the longitudinal axis A of the cylinder 20. The cavity 40 contains silicone oil and is configured to be in fluid communication with the second piston 30. Thus, the first piston 10 and the second piston 30 are both configured to be displaced along the longitudinal axis A of the cylinder 20. A lubricating oil passage 50 is provided into the apparatus 100. The lubricating oil passage 50 is defined to pass through the first piston 10, the second piston 30, and the cylinder 20. The lubricating oil passage 50 forms an L-shape. The first end 50a of the lubricating oil passage 50 terminates at an area where the first piston 10 and a sprocket wheel 80 are configured to interact. The second end 50b of the lubricating oil passage 50 terminates on the outside surface of the cylinder 10. Since the first piston 10 and the cylinder 20 have relative motion configured with respect to each other, the section of the lubricating oil passage 50 on the cylinder 10 misaligns with the section of the lubricating oil passage 50 at an instant during operation of the apparatus 100. This ensures an intermittent supply of lubricating oil to the sprocket wheel 80. The second end 50b is configured to be coupled with a lubricating oil reservoir 60 where the lubricating oil to be supplied to the chain drive. A metering valve 52 is coupled on the second end 50b of the lubricating oil passage 50 which facilitates measuring the amount of the lubricating oil consumed from the lubricating oil reservoir 60. A grease port 70 is provided on one end of the cylinder 20 which facilitates pressurized grease supply contained inside a grease dispenser 74. A pressure sensor 72 is provided on the cylinder 20 to sense the pressure of grease inside the cylinder 20. The first piston 10 is configured to be in fluid communication with the grease coming through the grease port 70. To prevent leaking of the silicone oil contained inside the cavity 40, seals are provided between the second piston 30 and the first piston 10.

In another embodiment, the apparatus 100 is configured on a plurality of chain drives (1000) simulataneously. This is achieved by installing the apparatus 100 in a centralized manner, thereby facilitating slack elimination and vibration damping as well as lubrication to a plurality of chain 400.

The working of the apparatus will now be explained with the help of FIGS. 2-4. A chain drive 1000 is shown in FIG. 2. A drive sprocket 200 and a driven sprocket 300 is placed at a desired distance apart from each other. The drive sprocket 200 and the driven sprocket 300 are connected by a chain 400 for transmission of power. The apparatus 100 is assembled on the slack side of chain 400. The slack in the chain 400 is removed by pressurizing the cylinder 20 with the grease from the grease port 70. Thus the initial tension in the chain 400 is maintained at a desired level. The second piston 30 is forced towards the second end 100b of the apparatus 100. Typically, a displacement of 10 mm is applied to the second piston 30 towards the second end 100b. This compresses the silicone oil inside the cavity 40 towards the second end 100b. Silicone oil is selected as the fluid inside the cavity 40 due to its excellent compressibility characteristics.

When the chain drive 1000 starts working, thrust forces act on the sprocket wheel 80 connected to the second piston 30, thereby pushing the second piston 30 from the first end 100a to the second end 100b. This results in the compression of the silicone oil inside the cylinder 20 between the first piston 10 and the second piston 30. When the chain 400 attains constant speed after sustaining the initial accelerations and decelerations due to starting of the chain drive 1000, the thrust incident on the second piston 30 reduces. Then, the silicone oil exerts force on the second piston 30 from the second end 100b to the first end 100a, thereby pushing the chain 400 into a mean position over the drive sprocket 200 as well as the driven sprocket 300. Thus vibrations are minimized with the help of the reciprocating second piston inside the first piston 10. FIG. 3 shows the instant at which the lubricating oil passage 50 is blocked, while FIG. 4 shows the instant at which the lubricating oil passage 50 transfers the lubricating oil from the lubricating oil reservoir 60 to the sprocket wheel 80. As shown in FIG. 4, the section of the lubricating oil passage 50 on the cylinder 20 aligns with the section of the lubricating oil passage 50 on the second piston 30. As the second piston 30 reciprocates inside the first piston 10, intermittent supply of lubricating oil takes place, which eliminates the need of frequent manual intervention for the same purpose. As the sprocket wheel 80 is configured to be meshed with the chain 400 of the chain drive 1000, lubricating oil is transferred from the apparatus 100 to the chain 400 of the chain drive 1000.

With prolonged usage of the chain drive 1000, the slack in the chain 400 of the chain drive 1000 increases and there arises a need for the first piston 10 to be displaced towards the first end 100a from the second end 100b. This is needed to eliminate slack and to ensure the desired tension in the chain 400 of the chain drive 1000. This is accomplished by pumping the grease through the grease port 70 towards the second end 100b of the apparatus 100. The pressure sensor 72 constantly senses pressure of the grease present inside the cylinder 20 exerted on the first piston 10. Slacking of the chain 400 causes reduction in pressure of the grease contained inside the cylinder 20. The pressure sensor 72 signals a pump 76 mounted in the grease reservoir to increase pressure of the grease at a desired level inside the cylinder 20. The desired pressure level of the grease inside the cylinder 20 is calibrated for the tension in the chain 400 of the chain drive 1000. Thus, slack in the chain 400 of the chain drive 1000 is eliminated and optimum tension is achieved, thereby reducing unnecessary vibrations which are detrimental to the longevity of the chain drive 1000.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of an apparatus for eliminating slack and vibrations of the chain of a chain drive that:

eliminates frequent maintenance and servicing of the chain drive;

eliminates requirement of skilled labour; and increases chain drive performance by eliminating unnecessary vibrations.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An apparatus (100) for eliminating slack and vibrations of a chain (400) of a chain drive (1000), the apparatus (100) being configured to transfer the chain slack and vibrations through a sprocket wheel (80) connected to the chain (400), the apparatus (100) comprising:
a piston-cylinder arrangement;
a first piston (10), a cylinder (20) in which said first piston (10) is configured to reciprocate, said cylinder (20) configured to be filled with a first fluid, a grease port (70) defined in said cylinder (20) for introducing and dispensing said first fluid into said cylinder (20) or therefrom, a pump (76) in fluid communication with said grease port (70), a pressure sensor (72) fitted inside said cylinder (20) to sense pressure of said first fluid in said cylinder (20), said pressure sensor (72) configured to be in communication with said pump (76), said grease port (70) configured to enable operation of said pump (76) when said pressure sensor (72) senses a reduced pressure in said cylinder (20) in response to a slackening of the chain (400), and thereby reduction in pressure exerted by said first piston (10) on said first fluid inside said cylinder (20);
a second piston (30) configured to reciprocate in a cavity (40) defined inside said first piston (10), said second piston (30) connected to said sprocket wheel (80) at one end (100a), a second compressible fluid filled in said cavity (40), arrangement of said second piston (30) is configured such that the vibrations received by said second piston (30) are damped by said second compressible fluid.

2. The apparatus (100) as claimed in claim 1, wherein a lubricating oil passage (50) is drilled through said second piston (30) and said cylinder (20), a first end (50a) of said lubricating oil passage (50) terminates at an engagement point with said sprocket wheel (80), and a second end (50b) of said lubricating oil passage (50) connected to a lubricating oil reservoir (60) for supplying lubricant to said engagement point.

3. The apparatus (100) as claimed in claim 2, wherein said lubricating oil passage (50) is L-shaped.

4. The apparatus (100) as claimed in claim 2, wherein a metering valve (52) is provided on one end of the lubricating oil passage (50).

5. The apparatus (100) as claimed in claim 1, wherein said compressible second fluid is silicone oil.

6. The apparatus (100) as claimed in claim 1, wherein said apparatus (100) is configured on a plurality of chain drives (1000) simultaneously.

7. The apparatus (100) as claimed in claim 1, wherein the orientation of a longitudinal axis (A) of said first piston (10), said second piston (30) and said (cylinder 20) with respect to said chain (400) is variable.

* * * * *